United States Patent
Leone et al.

(10) Patent No.: US 10,072,626 B1
(45) Date of Patent: Sep. 11, 2018

(54) METHODS AND SYSTEMS FOR IMPROVING ELECTRIC ENERGY STORAGE DEVICE DURABILITY FOR A STOP/START VEHICLE

(71) Applicant: Ford Global Technologies, LLC, Dearborn, MI (US)

(72) Inventors: Thomas G. Leone, Ypsilanti, MI (US); Kenneth James Miller, Canton, MI (US); Eric Michael Rademacher, Beverly Hills, MI (US); Alexander O'Connor Gibson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 11 days.

(21) Appl. No.: 15/452,398

(22) Filed: Mar. 7, 2017

(51) Int. Cl.
   *F02N 11/08* (2006.01)
   *B60W 30/188* (2012.01)

(52) U.S. Cl.
   CPC ....... *F02N 11/0833* (2013.01); *B60W 30/188* (2013.01); *F02N 11/0862* (2013.01); *F02N 2011/0888* (2013.01)

(58) Field of Classification Search
   CPC .. F02N 11/08; F02N 11/0833; F02N 11/0862; F02N 2011/0888; B60W 30/188
   See application file for complete search history.

(56) References Cited

U.S. PATENT DOCUMENTS

| | | | |
|---|---|---|---|
| 7,390,283 B2 | 6/2008 | Rinderknecht | |
| 8,417,407 B2* | 4/2013 | Nishimura | B60W 20/10 701/22 |
| 8,602,141 B2* | 12/2013 | Yee | B60L 11/1859 180/65.21 |
| 8,935,075 B2 | 1/2015 | Otanez et al. | |
| 2011/0130901 A1 | 6/2011 | Mori et al. | |
| 2014/0288803 A1 | 9/2014 | Deisler | |
| 2016/0305388 A1 | 10/2016 | Miller et al. | |

FOREIGN PATENT DOCUMENTS

WO     2016014396 A1    1/2016

OTHER PUBLICATIONS

Leone, Thomas G., "System and Method to Extend Operating Time of Valve Actuators of an Internal Combustion Engine," U.S. Appl. No. 15/272,999, filed Sep. 22, 2016, 41 pages.
Leone, Thomas G., et al., "Methods and Systems for Improving Engine Starter Durability for a Stop/Start Vehicle," U.S. Appl. No. 15/452,448, filed Mar. 7, 2017, 53 pages.

* cited by examiner

*Primary Examiner* — Hieu T Vo
(74) *Attorney, Agent, or Firm* — Julia Voutyras McCoy Russell LLP

(57) ABSTRACT

Systems and methods for restarting an engine are presented. In one example, an engine may be automatically stopped and started in response to thresholds that may be adjusted as a distance traveled by the vehicle increases. The thresholds may be adjusted responsive to useful life consumed of devices that may participate in automatic engine starting and stopping.

20 Claims, 4 Drawing Sheets

METHODS AND SYSTEMS FOR IMPROVING ELECTRIC ENERGY STORAGE DEVICE DURABILITY FOR A STOP/START VEHICLE

FIELD

The present description relates to a system and methods for improving durability of components for a vehicle with an engine that may be automatically stopped and started. The methods may be particularly useful for extending component life while still enabling automatic engine starting and stopping.

BACKGROUND AND SUMMARY

A vehicle may include an engine that may be automatically stopped and restarted without a driver of the vehicle specifically requesting an engine stop and start. The engine may be automatically stopped and restarted to conserve fuel. The engine may be stopped when the driver of the vehicle is not requesting torque while the vehicle is moving or while the vehicle is stopped. Before the engine is automatically stopped, a controller may require that certain conditions be met. For example, the controller may require that electric energy storage device state of charge is higher than a threshold, an electrical load applied to the vehicle electrical system is less than a threshold, electric energy storage device temperature is less than a threshold, and driver demand torque is less than a threshold. If the conditions are met, the engine may be automatically stopped and then restarted to conserve fuel. However, some vehicles may be more frequently automatically stopped and started as compared to other vehicles. Vehicle components used to automatically stop and start the engine may be constructed to provide the engine start/stop functionality over a predetermined vehicle travel distance even when the engine is frequently stopped and started; however, the cost of producing such vehicle components may be prohibitive. Therefore, it would be desirable to provide a way of permitting automatic engine stopping and starting over a predetermined travel distance with reasonable vehicle component cost.

The inventors herein have recognized the above-mentioned issues and have developed a vehicle operating method, comprising: estimating an amount of electric energy storage device useful life consumed via a controller; adjusting automatic engine stop/start thresholds in response to the amount of electric energy storage device useful life consumed; and starting or stopping the engine in response to the automatic engine start/stop thresholds via the controller.

By adjusting automatic engine stopping and starting thresholds in response to an amount of electric energy storage device useful life consumed, it may be possible to decrease frequency and rigorousness of automatic engine stops and starts so that devices may operate over their expected life cycle. Further, automatic engine stopping and starting may still be permitted so that the vehicle's fuel efficiency may be relatively high. In some examples, if the percent of useful life consumed of the device is less than a threshold, the automatic engine stopping and starting thresholds may be returned to base values. In this way, automatic engine stopping and stopping entry conditions may be made more or less rigorous depending on how the engine has been previously stopped and started so that component life may meet expectations while delivering desirable fuel economy.

The present description may provide several advantages. For example, the approach may allow engine components to reach a desired life span. In addition, the approach may allow component life spans to be met without having to make the components suitable for extreme duty cycle conditions. Further, the approach may be applicable to more than one type of component.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
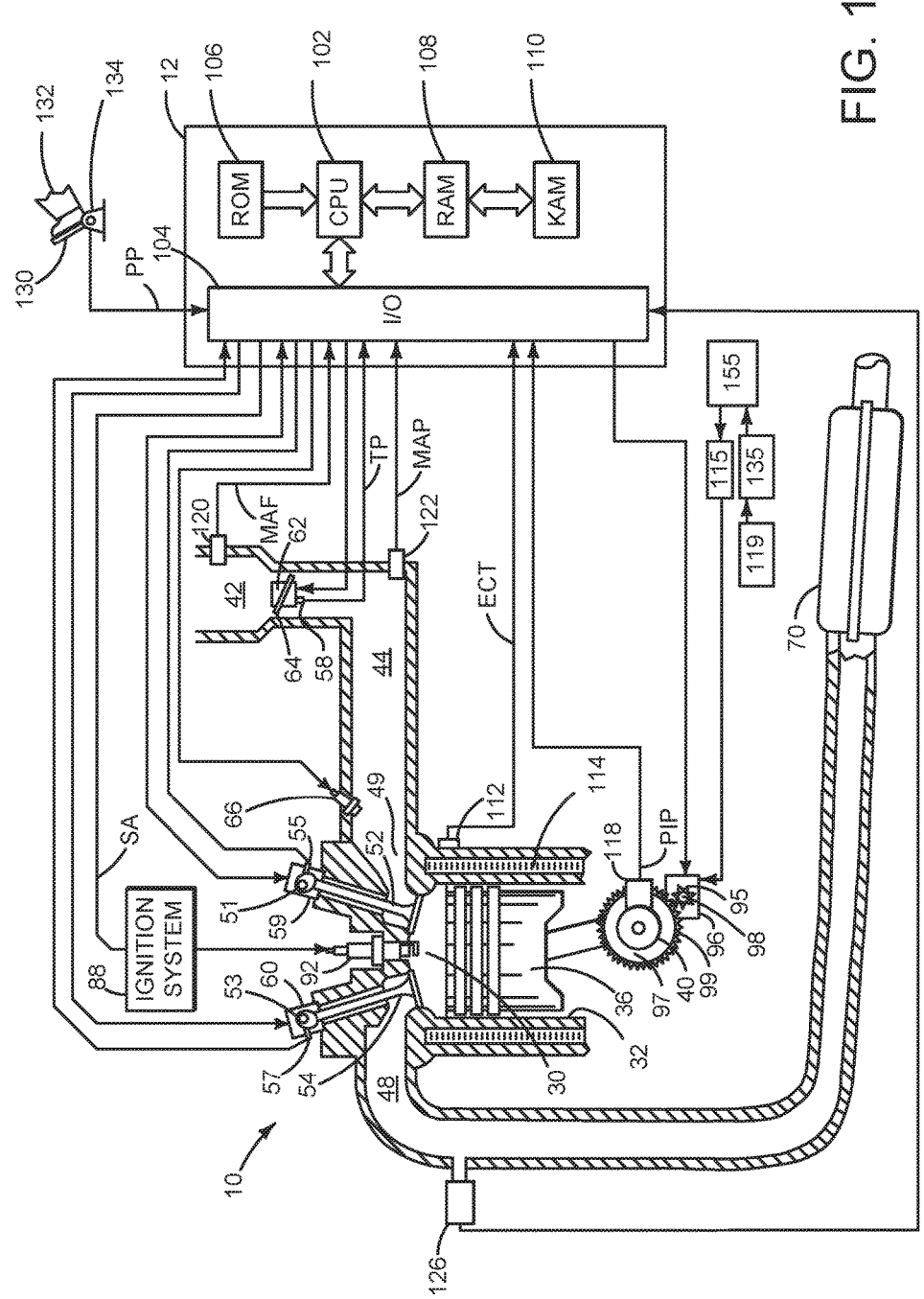
FIG. 1 is a schematic diagram of an engine.
Figure 2:
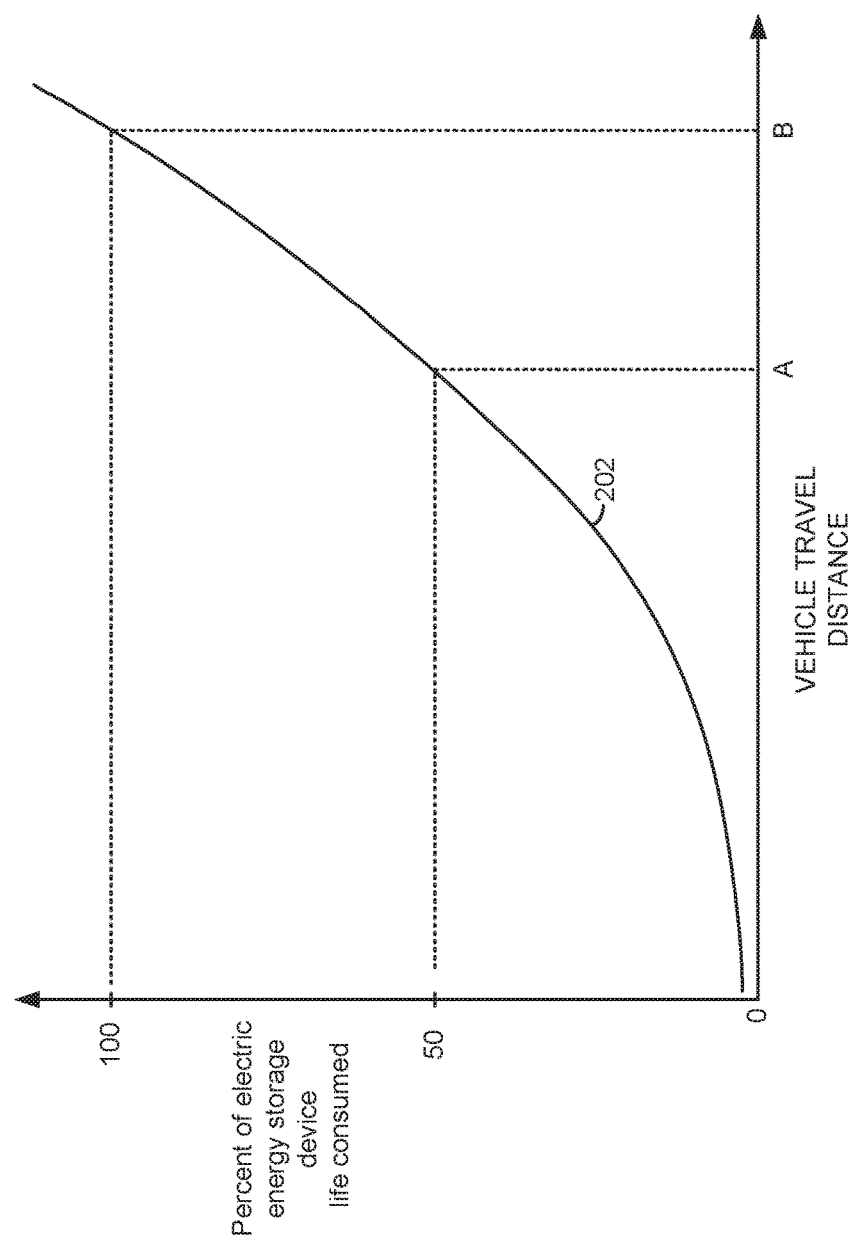
FIG. 2 is a prophetic example plot illustrating useful electric energy storage device life versus vehicle travel distance.
Figure 3:
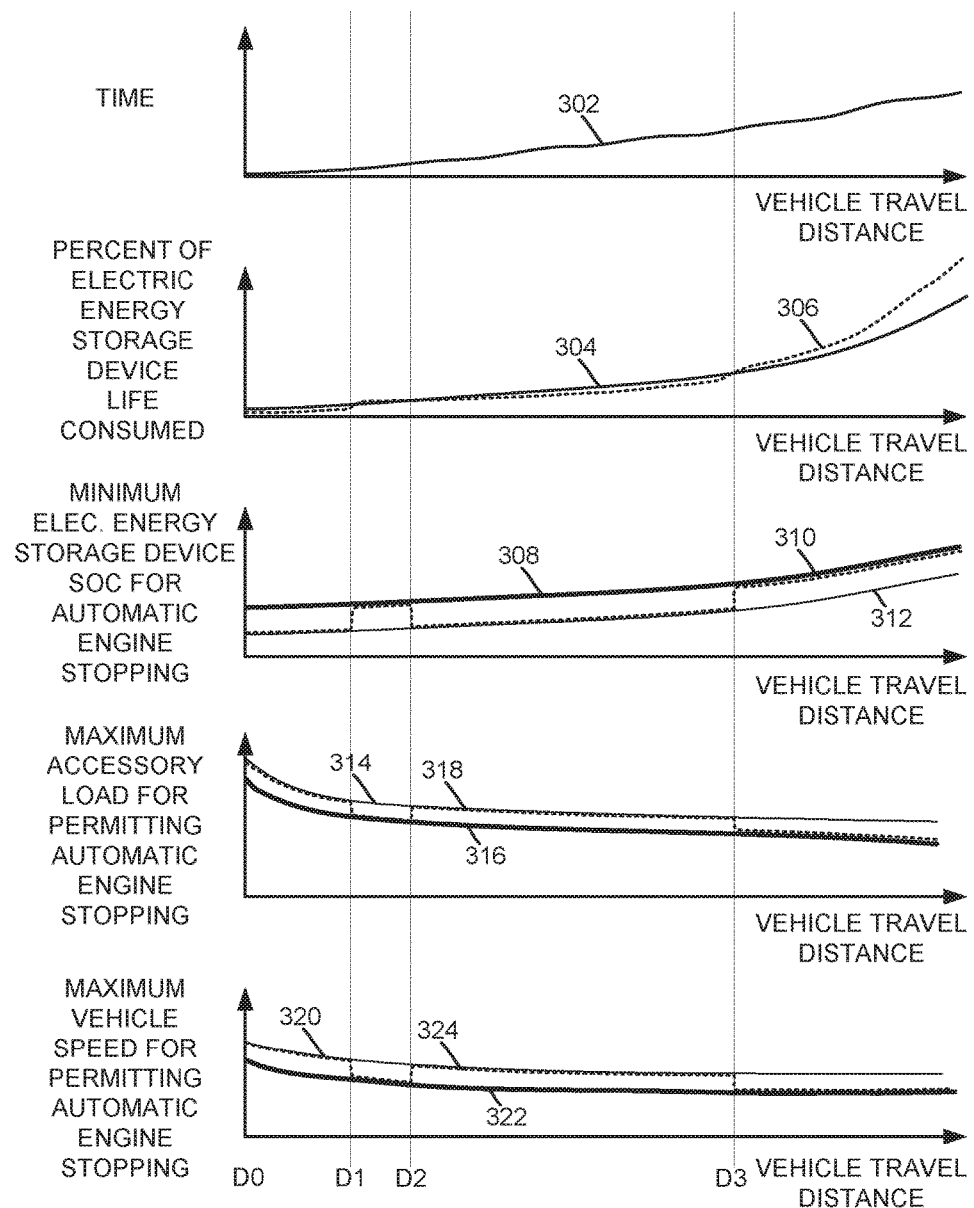
FIG. 3 shows plots of an example sequence for extending stop/start vehicle component life.
Figure 4:
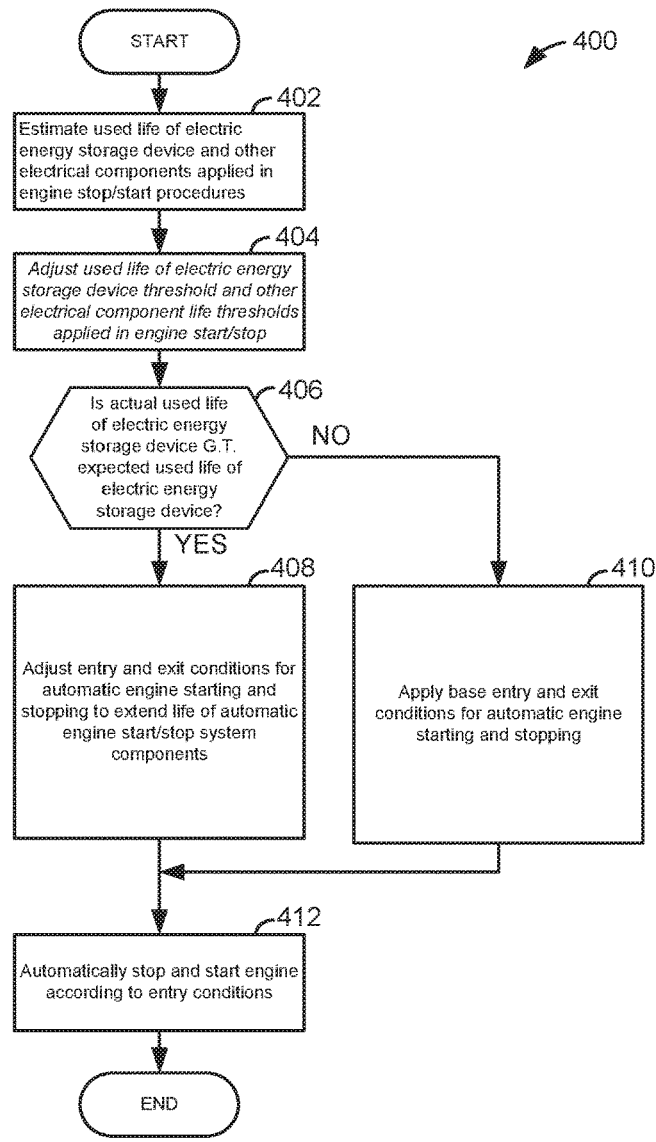
FIG. 4 is a flowchart showing one example method for extending stop/start vehicle component life.

The present description is related to extending life of vehicle components that participate in automatic engine stopping and starting. The engine may be automatically stopped and started based on vehicle conditions. FIG. 1 shows an example engine that may be automatically stopped and started. FIG. 2 shows an example curve that describes percentage of electric energy storage device life consumed versus vehicle travel distance. A prophetic sequence for extending vehicle component life according to the method of FIG. 4 is shown in FIG. 3. Finally, a method for providing desired component life over a predetermined vehicle travel distance is shown in FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40 via variable intake cam actuator 59 and variable exhaust cam actuator 60.

Starter 96 may receive electrical power from electric energy storage device 155 (e.g., battery or ultra-capacitor) via power relay or inverter system 115. Power relay/inverter 115 may close to allow current to flow from electric energy storage device 155 to starter 96 in response to a signal from controller 12. Power relay 115 may open to interrupt current flow from electric energy storage device 155 to starter 96 in response to a signal from controller 12. DC/DC converter 135 may provide power to electric energy storage device 155 from alternator or integrated starter generator 119. Crankshaft 40 may rotate alternator or integrated starter generator 119 to produce electrical power to charge electric energy storage device 155.

Fuel injector 66 is shown positioned to inject fuel directly into cylinder intake port 49, which is known to those skilled in the art as port fuel injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

The system of FIG. 1 provides for a vehicle system, comprising: an engine including a device, the device participating in automatically starting and stopping the engine; and a controller including non-transitory instructions executable to adjust automatic engine stop/start thresholds in response to an amount of useful life consumed of the device, and to automatically start or stop the engine in response to the automatic engine start/stop thresholds. The vehicle system includes where the device is one or more of an inverter system, rectifier system, of a DC/DC converter. The vehicle system includes where the device is an electric energy storage device. The vehicle system includes where the device is a capacitor or ultra-capacitor. The vehicle system includes where the device is a power relay. The vehicle system includes where the automatic engine stop/start thresholds include a minimum electric energy storage device state of charge threshold. The vehicle system includes where the automatic engine stop/start thresholds include a maximum electric energy storage device temperature. The vehicle system includes where the automatic engine stop/start thresholds include a maximum vehicle speed threshold. The vehicle system includes where automatic engine stop/start thresholds include a maximum accessory load threshold.

Referring now to FIG. 2, a prophetic example plot illustrating an estimated of percentage useful electric energy storage device life consumed versus vehicle travel distance is shown. The relationship shown in FIG. 2 may be incorporated into the system of FIG. 1 and the method of FIG. 3.

The plot includes a vertical axis representing percent of useful electric energy storage device life consumed and the vertical axis starts at a value of zero and ends at a value of one hundred. The horizontal axis represents a distance traveled by the vehicle and the actual distance traveled by the vehicle increases from the left side of the figure to the right side of the figure. The distance traveled at the vertical axis is zero.

Curve 202 shows an example relationship of percentage of useful electric energy storage device life consumed and distance traveled by the vehicle. In this example, the electric energy storage device is expected to be degraded when the percentage of useful electric energy storage device life consumed is one hundred percent. The distance traveled by the vehicle is expected to be the value at B when one hundred percent of useful electric energy storage device life is consumed. Thus, the electric energy storage device may be expected to operate for the distance corresponding to B. Similarly, half the useful life of the electric energy storage device, or fifty percent of useful electric energy storage device life consumed, may be expected to be consumed when the vehicle has traveled the distance corresponding to A. Curve 202 may be empirically determined from a variety of vehicle and electric energy storage device operating conditions as discussed in further detail with regard to method 400.

The percent of useful electric energy storage device life consumed may be estimated from curve 202 by determining an actual total distance traveled by the vehicle and indexing a table or function via the actual total distance traveled by the vehicle. The point on curve 202 where the distance traveled by the vehicle intersects curve 202 corresponds to a single value of useful electric energy storage device life consumed. In this way, percentage of useful electric energy storage device life consumed may be estimated via knowing the distance traveled by the vehicle. Data values that form curve 202 may be empirically determined and stored to controller memory.

Although FIG. 2 discloses a relationship between useful electric energy storage device life consumed and distance traveled by a vehicle, similar relationships between other components of a start/stop vehicle and distance traveled by a vehicle may be provided. For example, another curve or plot may describe a relationship between percent of useful life of a electric power relay consumed versus distance traveled by the vehicle. In this way, expected useful life consumed of the various vehicle devices associated with a stop/start vehicle may be estimated.

Referring now to FIG. 3, an example sequence illustrating modifications to an automatic engine stop/start procedure according to the method of FIG. 4 is shown. The operating sequence of FIG. 3 may be provided via the system of FIG. 1 executing instructions according to the method of FIG. 4 that are stored in non-transitory memory. Vertical markers D1-D3 represent times of particular interest during the sequence. All plots in FIG. 3 are aligned with regard to vehicle travel distance. Note that a small space may exist between traces to improve visibility even though the traces are described as being equal at some conditions.

The first plot from the top of FIG. 3 is a plot of time versus distance traveled by a vehicle. The vertical axis represents time and time increases in the direction of the vertical axis arrow. The horizontal axis represents distance traveled by the vehicle and the distance traveled increases in the direction of the horizontal axis arrow. Curve 302 indicates the relationship between time and distance traveled by the vehicle.

The second plot from the top of FIG. 3 is a plot of percentage of electric energy storage device life consumed versus distance traveled by a vehicle. The vertical axis represents percentage of electric energy storage device life consumed and percentage of electric energy storage device life consumed increases in the direction of the vertical axis arrow. The percent of electric energy storage device life consumed is zero when the electric energy storage device is new and percent of electric energy storage device life consumed is one hundred percent when the electric energy storage device is degraded. The horizontal axis represents distance traveled by the vehicle and the distance traveled increases in the direction of the horizontal axis arrow. Solid line curve 304 represents a predetermined expected relationship between percent of electric energy storage device life consumed and distance traveled by the vehicle and it may be referred to as a percentage of electric energy storage device useful life consumed threshold. Dotted line curve 306 represents a relationship between percentage of electric energy storage device life consumed and distance traveled by the vehicle that is determined in real-time as the vehicle is operated and travels an increasing amount of distance. Curve 306 may be referred to as the estimated percent of electric energy storage device useful life consumed.

The third plot from the top of FIG. 3 is a plot of minimum electric energy storage device state of charge (SOC) for automatic engine stopping versus distance traveled by a vehicle. The minimum electric energy storage device state of charge is a threshold level of electric energy storage device charge below which the engine is not automatically stopped. For example, if the minimum electric energy storage device SOC is 40% and the actual or measured electric energy storage device SOC is 35%, the engine will not be automatically stopped and started. However, if the actual or measured SOC is 65% then the engine may be automatically stopped and started. The vertical axis represents minimum electric energy storage device SOC for automatic engine stopping and minimum electric energy storage device SOC for automatic engine stopping increases in the direction of the vertical axis arrow. The horizontal axis represents distance traveled by the vehicle and the distance traveled increases in the direction of the horizontal axis arrow.

Solid line curve 312 represents a relationship between minimum electric energy storage device SOC for automatic engine stopping and distance traveled by the vehicle for an electric energy storage device exhibiting a low amount of degradation. Curve 312 may also be referred to as minimum electric energy storage device SOC threshold for automatic engine stopping for an electric energy storage device exhibiting a low amount of degradation or a lower electric energy storage device SOC threshold for automatic engine stopping for an electric energy storage device exhibiting a low amount of degradation. Solid line curve 308 represents a relationship between minimum electric energy storage device SOC for automatic engine stopping and distance traveled by the vehicle for an electric energy storage device that is older and exhibiting a higher level of degradation. Curve 308 may also be referred to as minimum electric energy storage device SOC threshold for automatic engine stopping for an electric energy storage device exhibiting a higher amount of degradation or a lower electric energy storage device SOC threshold for automatic engine stopping for an electric energy storage device exhibiting a higher amount of degradation. Dashed line curve 310 represents a minimum electric energy storage device SOC threshold for permitting automatic engine stopping responsive to the percentage of useful electric energy storage device life consumed at the present distance traveled by the vehicle. Operating the electric energy storage device at state of charge values below 310 may degrade the electric energy storage device in an undesirable way so automatic engine starting and stopping may be prohibited when electric energy storage device state of charge is below curve 310.

The fourth plot from the top of FIG. 3 is a plot of maximum accessory load for permitting automatic engine stopping versus distance traveled by a vehicle. The maximum accessory load for permitting automatic engine stopping is a threshold level of electrical load above which the engine is not automatically stopped. For example, if the maximum accessory load is 5 amperes and the actual or measured accessory load is 6 amperes, the engine will not be automatically stopped and started. However, if the actual or measured accessory load is 3 amperes then the engine may be automatically stopped and started. The vertical axis represents maximum accessory load for permitting automatic engine stopping and maximum accessory load for permitting automatic engine stopping increases in the direction of the vertical axis arrow. The horizontal axis represents distance traveled by the vehicle and the distance traveled increases in the direction of the horizontal axis arrow.

Solid line curve 314 represents a relationship between maximum accessory load for permitting automatic engine stopping and distance traveled by the vehicle for a new electric energy storage device. Curve 314 may also be referred to as maximum accessory load threshold for automatic engine stopping for an electric energy storage device exhibiting a low amount of degradation or an upper accessory load threshold for automatic engine stopping for an electric energy storage device exhibiting a low amount of degradation. Solid line curve 316 represents a relationship between maximum accessory load for permitting automatic engine stopping and distance traveled by the vehicle for an electric energy storage device that is older and partially degraded. Curve 316 may also be referred to as maximum accessory load threshold for automatic engine stopping for an electric energy storage device exhibiting a higher amount of degradation or an upper accessory load threshold for automatic engine stopping for an electric energy storage device exhibiting a higher amount of degradation. Dashed line curve 318 represents a maximum accessory load threshold for permitting automatic engine stopping responsive to the percentage of electric energy storage device life consumed at the present distance traveled by the vehicle. Operating the electric energy storage device when accessory load is above curve 318 may degrade the electric energy storage device in an undesirable way (e.g., higher current draw than is desired) so automatic engine starting may be prohibited when accessory load is above temperatures of curve 318.

The fifth plot from the top of FIG. 3 is a plot of maximum vehicle speed for permitting automatic engine stopping versus distance traveled by a vehicle. The maximum vehicle speed for permitting automatic engine stopping is a threshold level of vehicle speed above which the engine is not automatically stopped. For example, if the maximum vehicle speed for permitting automatic engine stopping is 35 Kph and the actual or measured vehicle speed 40 Kph, the engine will not be automatically stopped and started. However, if the actual or measured vehicle speed is 30 Kph then the engine may be automatically stopped and started. The vertical axis represents maximum vehicle speed for permitting automatic engine stopping and maximum vehicle speed for permitting automatic engine stopping increases in the direction of the vertical axis arrow. The horizontal axis represents distance traveled by the vehicle and the distance traveled increases in the direction of the horizontal axis arrow.

Solid line curve 320 represents a relationship between maximum vehicle speed for permitting automatic engine stopping and distance traveled by the vehicle for a new electric energy storage device. Curve 320 may also be referred to as the maximum vehicle speed threshold for permitting automatic engine stopping for an electric energy storage device exhibiting a lower amount of degradation or an upper vehicle speed threshold for permitting automatic engine stopping for an electric energy storage device exhibiting a lower amount of degradation. Solid line curve 322 represents a relationship between maximum vehicle speed for permitting automatic engine stopping and distance traveled by the vehicle for an electric energy storage device that is older and partially degraded. Curve 322 may also be referred to as maximum vehicle speed threshold for permitting automatic engine stopping for an electric energy storage device exhibiting a higher amount of degradation or an upper vehicle speed threshold for permitting automatic engine stopping for an electric energy storage device exhibiting a higher amount of degradation. Dashed line curve 324 represents a maximum vehicle speed for permitting automatic engine stopping responsive to the percentage of electric energy storage device life consumed at the present distance traveled by the vehicle. Operating the electric energy storage device when vehicle speed is above curve 324 may degrade the electric energy storage device in an undesirable way (e.g., higher current draw than is desired) so automatic engine starting may be prohibited when vehicle speed is above temperatures of curve 324.

At travel distance D0, the amount of time in the first plot is zero and the estimated percent of electric energy storage device life consumed (curve 306) is less than the predetermined percent of electric energy storage device life consumed threshold (curve 304). The minimum electric energy storage device SOC for automatic engine stopping (curve 310) is adjusted to a low level that is equal to the threshold electric energy storage device SOC for automatic engine stopping for an electric energy storage device exhibiting a low amount of degradation (curve 312). Therefore, the engine is permitted to automatically stop and start when electric energy storage device SOC is greater than the level of curve 312 because the electric energy storage device is exhibiting a low amount of degradation. The maximum accessory load for permitting automatic engine stopping (curve 318) is adjusted to a higher level that is equal to the maximum accessory load threshold for automatic engine stopping for an electric energy storage device exhibiting a low amount of degradation (curve 314). Consequently, the engine is permitted to automatically stop and start when accessory load is at a higher level because the electric energy storage device is exhibiting a low amount of degradation. The maximum vehicle speed for permitting automatic engine stopping (curve 324) is adjusted to a higher level that is equal to the maximum vehicle speed threshold for permitting automatic engine stopping for an electric energy storage device exhibiting a lower amount of degradation (curve 320). As such, the engine is permitted to automatically stop and start when vehicle speed is higher because the electric energy storage device is exhibiting a low amount of degradation.

Between distance D0 and distance D1, the amount of time increases and the distance traveled by the vehicle increases. The estimated percent of electric energy storage device life consumed (curve 306) increases but it remains less than the predetermined percent of electric energy storage device life consumed threshold (curve 304). Further, the expected relationship between percent of electric energy storage device life consumed and distance traveled by the vehicle (curve 304) increases to show that expected electric energy storage device degradation increases with distance traveled by the vehicle. The estimated percent of electric energy storage device life consumed (curve 306) increases but it remains less than the expected percentage of electric energy storage device life consumed threshold (curve 304).

The minimum electric energy storage device SOC for automatic engine stopping for an electric energy storage device exhibiting a low amount of degradation (curve 312) increases to show that the minimum electric energy storage device state of charge for automatic engine stopping with a small amount of electric energy storage device degradation increases as distance traveled by the vehicle increases. Likewise, minimum electric energy storage device SOC for automatic engine stopping for an electric energy storage device exhibiting a higher amount of degradation (curve 308) increases to show that minimum electric energy storage device state of charge for automatic engine stopping with a larger amount of electric energy storage device degradation increases as distance traveled by the vehicle increases. The minimum electric energy storage device SOC for automatic engine stopping responsive to percentage of electric energy storage device life consumed at the present distance traveled by the vehicle (curve 310) follows and stays equal to the minimum electric energy storage device SOC for automatic engine stopping for an electric energy storage device exhibiting a low amount of degradation (curve 312).

The maximum accessory load for permitting automatic engine stopping for an electric energy storage device exhibiting a low amount of degradation (curve 314) decreases to show that the maximum accessory load for automatic engine stopping with a small amount of electric energy storage device degradation decreases as distance traveled by the vehicle increases. Likewise, maximum accessory load for permitting automatic engine stopping for an electric energy storage device exhibiting a higher amount of degradation (curve 316) decreases to show that the maximum accessory load for automatic engine stopping with a larger amount of electric energy storage device degradation decreases as distance traveled by the vehicle increases. The maximum accessory load for permitting automatic engine stopping responsive to percentage of electric energy storage device life consumed at the present distance traveled by the vehicle (curve 318) follows and stays equal to the maximum electric energy storage device SOC for automatic engine stopping for an electric energy storage device exhibiting a low amount of degradation (curve 318).

The maximum vehicle speed for permitting automatic engine stopping for an electric energy storage device exhibiting a low amount of degradation (curve 320) decreases to show that the maximum vehicle speed for automatic engine stopping with a small amount of electric energy storage device degradation decreases as distance traveled by the vehicle increases. Likewise, maximum vehicle speed for permitting automatic engine stopping for an electric energy storage device exhibiting a higher amount of degradation (curve 322) decreases to show that the maximum vehicle speed for automatic engine stopping with a larger amount of electric energy storage device degradation decreases as distance traveled by the vehicle increases. The maximum vehicle speed for permitting automatic engine stopping responsive to percentage of electric energy storage device life consumed at the present distance traveled by the vehicle (curve 324) follows and stays equal to the maximum vehicle speed for automatic engine stopping for an electric energy storage device exhibiting a low amount of degradation (curve 320).

At distance D1, the amount of time in the first plot and the distance traveled continue to increase. The estimated percent of electric energy storage device life consumed (curve 306) increases to a value greater than the predetermined percent of electric energy storage device life consumed threshold (curve 304). Consequently, the minimum electric energy storage device SOC for automatic engine stopping is adjusted to a higher level that is equal to the minimum electric energy storage device SOC threshold for automatic engine stopping for an electric energy storage device exhibiting a higher amount of degradation (curve 308). Therefore, the engine is permitted to automatically stop and start when electric energy storage device SOC is at a higher level so that the electric energy storage device may be exposed to less rigorous conditions to extend electric energy storage device life. The maximum accessory load for permitting automatic engine stopping is adjusted to a lower level that is equal to the maximum accessory load threshold for automatic engine stopping for an electric energy storage device exhibiting a higher amount of degradation (curve 316). As a result, the engine is permitted to automatically stop and start when accessory load is at a lower level so that conditions that may accelerate electric energy storage device degradation to a level greater than desired may be avoided. The maximum vehicle speed for permitting automatic engine stopping (curve 324) is adjusted to a lower level that is equal to the maximum vehicle speed threshold for permitting automatic engine stopping for an electric energy storage device exhibiting a higher amount of degradation (curve 322). This change permits the engine to automatically stop and start when vehicle speed is lower; thereby, potentially reducing the actual total number of automatic engine stops and start to reduce the possibility of electric energy storage device degradation exceeding a desired level.

Between distance D1 and distance D2, the amount of time increases and the distance traveled by the vehicle increases. The estimated percent of electric energy storage device life consumed (curve 306) remains above the predetermined percent of electric energy storage device life consumed (curve 304), but the measured percentage of electric energy storage device life consumed increases at a slow rate. In addition, the expected relationship between percent of electric energy storage device life consumed and distance traveled by the vehicle (curve 304) continues to increase.

The minimum electric energy storage device SOC for automatic engine stopping for an electric energy storage device exhibiting a low amount of degradation (curve 312) increases and the minimum electric energy storage device SOC for automatic engine stopping for an electric energy storage device exhibiting a higher amount of degradation (curve 308) also increases with distance traveled. The minimum electric energy storage device SOC for automatic engine stopping responsive to percentage of electric energy storage device life consumed at the present distance traveled by the vehicle (curve 310) follows and stays equal to the minimum electric energy storage device SOC threshold for automatic engine stopping for an electric energy storage device exhibiting a higher amount of degradation (curve 308). Adjusting the minimum electric energy storage device SOC for automatic engine stopping responsive to electric energy storage device life consumed in this way may extend electric energy storage device life and reduce a rate of electric energy storage device degradation.

The maximum accessory load for permitting automatic engine stopping for an electric energy storage device exhibiting a low amount of degradation (curve 314) decreases and the maximum accessory load for permitting automatic engine stopping for an electric energy storage device exhibiting a higher amount of degradation (curve 316) also decreases. The maximum accessory load for permitting automatic engine stopping responsive to percentage of electric energy storage device life consumed at the present distance traveled by the vehicle (curve 318) follows and stays equal to the maximum accessory load threshold for automatic engine stopping for an electric energy storage device exhibiting a higher amount of degradation (curve 316) to extend electric energy storage device life. The maximum vehicle speed for permitting automatic engine stopping responsive to percentage of electric energy storage device life consumed at the present distance traveled by the vehicle (curve 324) follows and stays equal to the maximum vehicle speed threshold for permitting automatic engine stopping for an electric energy storage device exhibiting a higher amount of degradation (curve 322).

At distance D2, the amount of time in the first plot and the distance traveled continue to increase. The estimated percent of electric energy storage device life (curve 306) consumed falls below the predetermined percent of electric energy storage device life consumed threshold (curve 304). Therefore, the minimum electric energy storage device SOC for automatic engine stopping is adjusted to a lower level that is equal to the minimum electric energy storage device SOC threshold for automatic engine stopping for an electric energy storage device exhibiting a low amount of degradation (curve 312). This allows the engine to be automatically stopped and started when electric energy storage device SOC is at a lower level so that vehicle fuel economy may be increased. The maximum accessory load for permitting automatic engine stopping is also adjusted to a higher level that is equal to the maximum accessory load threshold for automatic engine stopping for an electric energy storage device exhibiting a low amount of degradation (curve 314). This action allows the engine to be automatically stopped and started when accessory load is at a higher level so that vehicle fuel economy may be increased. The maximum vehicle speed for permitting automatic engine stopping is adjusted to a higher level that is equal to the maximum vehicle speed threshold for permitting automatic engine stopping for an electric energy storage device exhibiting a lower amount of degradation (curve 320) so that vehicle fuel economy may be increased.

Between distance D2 and distance D3, the amount of time increases and the distance traveled by the vehicle increases. The estimated percent of electric energy storage device life consumed (curve 306) remains below the predetermined percent of electric energy storage device life consumed threshold (curve 304) so the electric energy storage device is estimated to exhibit a lower level of degradation. Additionally, the percentage of electric energy storage device useful life consumed threshold (curve 304) continues to increase.

The minimum electric energy storage device SOC for automatic engine stopping for an electric energy storage device exhibiting a low amount of degradation (curve 312) continues to increase and the minimum electric energy storage device SOC for automatic engine stopping for an electric energy storage device exhibiting a higher amount of degradation (curve 308) continues to increase with distance traveled. The minimum electric energy storage device SOC for automatic engine stopping responsive to percentage of electric energy storage device life consumed at the present distance traveled by the vehicle (curve 310) follows and stays equal to the minimum electric energy storage device SOC threshold for automatic engine stopping for an electric energy storage device exhibiting a low amount of degradation (curve 312).

The maximum accessory load threshold for permitting automatic engine stopping for an electric energy storage device exhibiting a low amount of degradation (curve 314) continues to decrease and the maximum accessory load threshold for permitting automatic engine stopping for an electric energy storage device exhibiting a higher amount of degradation (curve 316) also continues to decrease. The maximum accessory load for permitting automatic engine stopping responsive to percentage of electric energy storage device life consumed at the present distance traveled by the vehicle (curve 318) follows and stays equal to the maximum accessory load threshold for automatic engine stopping for an electric energy storage device exhibiting a low amount of degradation (curve 314) to improve vehicle fuel economy. The maximum vehicle speed for permitting automatic engine stopping responsive to percentage of electric energy storage device life consumed at the present distance traveled by the vehicle (curve 324) follows and stays equal to the maximum vehicle speed threshold for permitting automatic engine stopping for an electric energy storage device exhibiting a lower amount of degradation (curve 320).

At distance D3, the amount of time in the first plot and the distance traveled continue to increase. The measured percent of electric energy storage device life consumed increases to a value greater than the predetermined percent of electric energy storage device life consumed (curve 304) for a second time. Therefore, the minimum electric energy storage device SOC for automatic engine stopping (curve 310) is adjusted to a higher level that is equal to the minimum electric energy storage device SOC threshold for automatic engine stopping for an electric energy storage device exhibiting a higher amount of degradation (curve 308). This action allows the engine to automatically stop and start when electric energy storage device SOC is at a higher level so that the electric energy storage device may be exposed to less rigorous conditions to extend electric energy storage device life. The maximum accessory load for permitting automatic engine stopping (curve 318) is also adjusted to a lower level that is equal to the maximum accessory load threshold for automatic engine stopping for an electric energy storage device exhibiting a higher amount of degradation (curve 316). In this way, the engine is permitted to automatically stop and start when accessory load is at a lower level, instead of a higher level, so that conditions that may accelerate electric energy storage device degradation to a level greater than desired may be avoided. The maximum vehicle speed for permitting automatic engine stopping (curve 324) is adjusted to a lower level that is equal to the maximum vehicle speed threshold for permitting automatic engine stopping for an electric energy storage device exhibiting a higher amount of degradation (curve 322) so that the engine may only automatically stop and start when vehicle speed is lower.

In this way, thresholds that define whether or not an engine may be automatically stopped and started may be adjusted to compensate for component life consumed. This may help to ensure that a vehicle may travel a desired distance before degradation of selected vehicle components may be expected.

Referring now to FIG. 4, a flow chart describing a method for controlling degradation of start/stop vehicle components is shown. The method of FIG. 4 may be incorporated into and may cooperate with the system of FIG. 1 to provide the operating sequence shown in FIG. 3. Further, at least portions of the method of FIG. 4 may be incorporated as executable instructions stored in non-transitory memory while other portions of the method may be performed via a controller transforming operating states of devices and actuators in the physical world.

At 402, method 400 estimates a percentage of vehicle component life that has been consumed. One estimate of component life consumed is provided for an electric energy storage device (e.g., a battery or ultra-capacitor). The amount of electric energy storage device life consumed may be estimated via the following equation:

$$ELC = \sum_{i}^{n} f_i(\Delta SOC, T, E_{temp})$$

where ELC is electric energy storage device life consumed, f is a function that estimates percentage of electric energy storage device life consumed during a charging or discharging event (e.g., a period of time where the electric energy storage device is charging or discharging), i is a variable identifying the present electric energy storage device charge or discharge cycle event number, Δ SOC is an average rate of change for electric energy storage device state of charge during the present electric energy storage device charging or discharging event, t is the duration of the electric energy storage device charging or discharging event, and $E_{temp}$ is average electric energy storage device temperature during the present electric energy storage device charging or discharging event. An electric energy storage device charging event may begin after an electric energy storage device has finished a discharging cycle and begins to be charged. The electric energy storage device charging cycle may end when the electric energy storage device begins to discharge. An electric energy storage device discharging event may begin after an electric energy storage device has finished a charging cycle and begins to discharge. The electric energy storage device discharging cycle may end when the electric energy storage device begins to charge. The value of i is incremented for each new charging cycle and each new discharging cycle. In one example, function f is outputs empirically determined values of percentage of electric energy storage device life consumed for an electric energy storage device charging or discharging cycle responsive to A SOC, t, and $E_{temp}$. The parameters A SOC, t, and $E_{temp}$ provide indications of electric energy storage device performance, which may be useful to determine electric energy storage device stress since lower SOC, t, and $E_{temp}$ may influence stress on an electric energy storage device. By factoring these parameters into electric energy storage device life consumption estimation, a more accurate estimate of electric energy storage device life may be provided.

Method 400 may also include an estimate of DC/DC converter life consumed and an estimate of power relay life consumed. The amount of DC/DC converter life consumed may be estimated via the following equation:

$$DLC = \sum_{i}^{n} g_i(\Delta I, t, DC_{temp})$$

where DLC is DC/DC converter life consumed, g is a function that estimates percentage of DC/DC converter life consumed during an electric energy storage device charging or discharging event (e.g., a period of time where the electric energy storage device is charging or discharging), is a variable identifying the present electric energy storage device charge or discharge cycle event number, ΔI is an average rate of change of DC/DC current input or output during the present electric energy storage device charging or discharging event, t is the duration of the electric energy storage device charging or discharging event, and $DC_{temp}$ is average DC/DC converter temperature during the present electric energy storage device charging or discharging event. In one example, function g is outputs empirically determined values of percentage of DC/DC converter useful life consumed for an electric energy storage device charging or discharging cycle responsive to ΔI, t, and $DC_{temp}$. The parameters Δ I, t, and $DC_{temp}$ provide indications of DC/DC converter performance, which may be useful to determine DC/DC converter stress since lower I, t, and $DC_{temp}$ may influence stress on the DC/DC converter. By factoring these parameters into DC/DC converter life consumption estimation, a more accurate estimate of electric energy storage device life may be provided.

The amount of power relay life consumed may be estimated via the following equation:

$$PLC = \sum_{j}^{n} h_j(\Delta I, P_{temp})$$

where PLC is power relay life consumed, h is a function that estimates percentage of power relay life consumed during power relay operation (e.g., a period of time where the electric energy storage device is charging or discharging), j is a variable identifying the present opening or closing event number for the power relay, ΔI is an average rate of change current flow through the power relay when the power relay is opened or closed and $P_{temp}$ is average power relay temperature during the present power relay opening or closing event. In one example, function h is outputs empirically determined values of percentage of power relay life consumed for a power relay opening or closing event (e.g., contacts of the power relay close to allow current flow through the power relay and contacts of the power relay open to not allow current flow through the power relay). Estimates for amount of useful life consumed of other components, such as an invertor, may be estimated in a similar way. Method 400 proceeds to 404.

At 404, method 400 adjusts the electric energy storage device useful life consumed threshold (e.g., 304 of FIG. 3), the DC/DC converter useful life consumed threshold, and the power relay useful life consumed threshold. In one example, each of the electric energy storage device useful life consumed threshold, the DC/DC converter useful life consumed threshold, and the power relay useful life consumed threshold may be expressed as polynomials. The coefficients of the respective polynomials may be adjusted responsive to vehicle operating conditions to increase the respective useful life consumed thresholds or decrease the useful life thresholds with respect to distance the vehicle travels. For example, if the electric energy storage device useful life threshold is approximated by:

$$EUL = a + bD + cD^2$$

where EUL is the percentage of electric energy storage device useful life consumed, a is a first coefficient, b is a second coefficient, c is a third coefficient, and D is distance traveled by the vehicle. Coefficients a, b, and c may be adjusted to increase EUL for a given D or decrease EUL for the given D. For example, coefficient a may be a function of ambient temperature, ambient humidity, and other vehicle operating conditions, and the state of the vehicle operating conditions may operate to modify coefficient a. Method 400 proceeds to 406 after adjusting the electric energy storage device useful life threshold, the DC/DC converter useful life threshold, and the power relay threshold.

At 406, method 400 judges if the percentage of actual electric energy storage device useful life consumed is greater than the electric energy storage device useful life consumed threshold. An example visual reference of estimated electric energy storage device useful life consumed (e.g., 306) and the electric energy storage device useful life consumed threshold (e.g., 304) is provided in the second plot from the top of FIG. 3. Further, method 400 may judge if the percentage of actual DC/DC converter useful life consumed is greater than the DC/DC converter useful life consumed threshold. Method 400 may also judge if the percentage of actual power relay useful life consumed is greater than the power relay useful life consumed threshold. If method 400 judges that the estimated electric energy storage device useful life consumed is greater than the electric energy storage device useful life consumed threshold, the answer is yes and method 400 proceeds to 408. Similarly, if method 400 judges that the estimated DC/DC converter useful life consumed is greater than the DC/DC converter useful life consumed threshold, the answer is yes and method 400 proceeds to 408. Further, if method 400 judges that the estimated power relay useful life consumed is greater than the power relay useful life consumed threshold, the answer is yes and method 400 proceeds to 408. However, if the estimates of electric energy storage device useful life consumed, DC/DC converter useful life consumed, and power relay useful life consumed do not exceed their respective thresholds, the answer is no and method 400 proceeds to 410.

At 408, method 400 adjusts entry conditions that permit automatic engine starting and stopping. An engine may be automatically started and stopped without a driver requesting engine start or stop through a dedicated input for engine starting and stopping (e.g., an ignition switch or key switch). In particular, an engine may be stopped when driver demand torque as determined from an accelerator pedal position or an autonomous vehicle controller output is less than a threshold. However, the engine may not be permitted to automatically stop and start responsive to driver demand unless other conditions are also met. For example, for an automatic engine stop to be permitted, electric energy storage device SOC must be greater than a minimum electric energy storage device SOC threshold. Further, for an automatic engine stop to be permitted, electrical load on the vehicle electrical system (e.g., electrical power drawn from the electrical system) must be less than a threshold electrical load. In addition, for an automatic engine stop to be permitted, vehicle speed may have to be less than a vehicle speed threshold. The thresholds against which vehicle operating conditions are compared to before allowing or rejecting automatic engine stopping and starting may be referred to as entry conditions for automatically stopping the engine (e.g., automatically ceasing engine rotation). Similar entry conditions are provided for automatically starting an engine that is stopped and not rotating.

The entry conditions or thresholds may require different conditions to be met before an engine is automatically stopped or started as a distance the vehicle travels increases. For example, as shown in FIG. 3, electric energy storage device SOC may be compared to a minimum electric energy storage device SOC threshold to determine if automatic engine stopping is permitted. The minimum electric energy storage device SOC threshold may increase as a distance the vehicle travels increases. The minimum electric energy storage device SOC threshold may be set to a minimum electric energy storage device SOC threshold above which the engine may be automatically stopped for an electric energy storage device exhibiting low degradation (curve 312) or a minimum electric energy storage device SOC threshold at which the engine may be automatically stopped for an electric energy storage device exhibiting higher degradation (curve 308). At 408, method 400 may require that electric energy storage device SOC be greater than the minimum electric energy storage device SOC threshold. Method 400 may also require that the minimum electric energy storage device SOC threshold be equal to an electric energy storage device SOC threshold for automatic engine stopping for an electric energy storage device exhibiting a higher amount of degradation (curve 308) when the actual percentage of electric energy storage device useful life consumed is greater than the expected electric energy storage device useful life threshold. Method 400 may also require that the minimum electric energy storage device SOC threshold be equal to an electric energy storage device SOC threshold for automatic engine stopping for a DC/DC converter exhibiting higher degradation when actual percentage of DC/DC converter useful life consumed is greater than the expected DC/DC converter useful life threshold. Method 400 may also require that the minimum electric energy storage device SOC threshold be equal to an electric energy storage device SOC threshold for automatic engine stopping when a power relay is exhibiting higher degradation and when actual percentage of power relay useful life consumed is greater than the expected power relay useful life threshold. For a particular distance traveled by the vehicle, the minimum electric energy storage device SOC threshold for permitting automatic engine stopping for an electric energy storage device exhibiting higher degradation is greater than the minimum electric energy storage device SOC threshold for permitting automatic engine stopping for an electric energy storage device exhibiting less degradation as shown in FIG. 3.

Similarly, electric energy storage device SOC may be compared to a minimum electric energy storage device SOC threshold to determine if automatic engine starting is permitted. The minimum electric energy storage device SOC threshold may increase as a distance the vehicle travels increases to ensure engine starting. The minimum electric energy storage device SOC threshold may be set to a minimum electric energy storage device SOC threshold above which the engine may be automatically started for an electric energy storage device exhibiting low degradation or a minimum electric energy storage device SOC threshold above which the engine may be automatically started for an electric energy storage device exhibiting higher degradation. At 408, method 400 may require that electric energy storage device SOC be greater than the minimum electric energy storage device SOC threshold. Method 400 may also require that the minimum SOC threshold be equal to an electric energy storage device SOC threshold for automatic engine starting for an electric energy storage device exhibiting higher degradation when the actual percentage of electric energy storage device useful life consumed is greater than the expected electric energy storage device useful life threshold so that a higher confidence level of engine starting may be provided and so that the possibility of electric energy storage device degradation may be reduced. Further, method 400 may require that the electric energy storage device SOC threshold be equal to the minimum electric energy storage device SOC threshold for automatic engine starting for a DC/DC converter exhibiting a higher amount of degradation when actual percentage of DC/DC converter useful life consumed is greater than the expected DC/DC converter useful life threshold. Method 400 may also require that the electric energy storage device SOC threshold be equal to the minimum electric energy storage device SOC threshold for automatic engine starting for a power relay exhibiting a higher amount of degradation when an estimated percentage of power relay useful life consumed is greater than the expected power relay useful life threshold. For a particular distance traveled by the vehicle, minimum electric energy storage device SOC threshold for permitting automatic engine starting for an electric energy storage device exhibiting higher degradation is greater than the minimum electric energy storage device SOC threshold for permitting automatic engine starting for an electric energy storage device exhibiting less degradation.

Accessory load may be compared to a maximum accessory load (e.g., an electrical load or power consumed by electric consumers of the vehicle) threshold for permitting automatic engine stopping, and the maximum accessory load threshold may be decreased as a distance the vehicle travels increases. Additionally, there may be a maximum accessory load threshold below which the engine may be automatically stopped for an electric energy storage device exhibiting low degradation (curve 314) and a maximum accessory load threshold below which the engine may be automatically stopped for an electric energy storage device exhibiting higher degradation (curve 316). At 408, method 400 may require that the accessory load be less than the maximum accessory load threshold. Method 400 may also require that the maximum accessory load threshold be equal to an accessory load threshold for automatic engine stopping for an electric energy storage device exhibiting higher degradation (curve 316) when the actual percentage of electric energy storage device useful life consumed is greater than the expected electric energy storage device useful life threshold. Method 400 may also require that the accessory load threshold be equal to the maximum accessory load threshold for automatic engine stopping for a DC/DC converter exhibiting higher degradation when the actual percentage of DC/DC converter useful life consumed is greater than the expected DC/DC converter useful life threshold. Method 400 may also require that the accessory load threshold be equal to the maximum accessory load threshold for automatic engine stopping for a power relay exhibiting higher degradation (curve 316) when the actual percentage of power relay useful life consumed is greater than the expected power relay useful life threshold. The maximum accessory load threshold for permitting automatic engine stopping for an electric energy storage device exhibiting higher degradation is less than the maximum accessory load threshold for permitting automatic engine stopping for an electric energy storage device exhibiting less degradation as shown in FIG. 3.

Accessory load may be compared to a maximum accessory load threshold for permitting automatic engine starting, and the maximum accessory load threshold may be decreased as a distance the vehicle travels increases so that the engine is restarted sooner if accessory load increases while the engine is stopped. There may also be a maximum accessory load threshold at which the engine may be automatically started for an electric energy storage device exhibiting low degradation and a maximum accessory load threshold at which the engine may be automatically started for an electric energy storage device exhibiting higher degradation. At 408, method 400 may require that the maximum accessory load be less than the maximum accessory load threshold. Method 400 may also require that the maximum accessory load threshold be equal to a maximum accessory load for automatic engine starting for an electric energy storage device exhibiting higher degradation when the actual percentage of electric energy storage device useful life consumed is greater than the expected electric energy storage device useful life threshold. Similarly, method 400 may require that the accessory load threshold be equal to the maximum accessory load threshold for automatic engine starting for a DC/DC converter exhibiting higher degradation when actual percentage of DC/DC converter useful life consumed is greater than the expected DC/DC converter useful life threshold. Method 400 may also require that the accessory load threshold be equal to the maximum accessory load threshold for automatic engine starting for a power relay exhibiting higher degradation when actual percentage of power relay useful life consumed is greater than the expected power relay useful life threshold. The maximum accessory load threshold for an electric energy storage device exhibiting higher degradation is less than the maximum accessory load threshold for an electric energy storage device exhibiting less degradation.

The maximum vehicle speed at which an engine may be automatically be stopped may decrease as a distance the vehicle travels increases so that the possibility of stopping the engine may be reduced, thereby reducing possibility of degrading engine stop/start system components. There may also be a maximum vehicle speed threshold at which the engine may be automatically stopped for an electric energy storage device exhibiting low degradation and a maximum vehicle threshold at which the engine may be automatically stopped for an electric energy storage device exhibiting higher degradation. At 408, method 400 may require that the vehicle speed be less than the maximum vehicle speed threshold. Method 400 may also require that the maximum vehicle speed threshold be equal to a maximum vehicle speed threshold for automatic engine stopping for an electric energy storage device exhibiting higher degradation when the actual percentage of electric energy storage device useful life consumed is greater than the expected electric energy storage device useful life threshold. Similarly, method 400 may require that the maximum vehicle speed threshold be equal to the maximum vehicle speed threshold for automatic engine stopping for a DC/DC converter exhibiting higher degradation when actual percentage of DC/DC converter useful life consumed is greater than the expected DC/DC converter useful life threshold. Method 400 may also require that the maximum vehicle speed threshold be equal to the maximum vehicle speed threshold for automatic engine stopping for a power relay exhibiting higher degradation when actual percentage of power relay useful life consumed is greater than the expected power relay useful life threshold. The maximum vehicle speed threshold for an electric energy storage device exhibiting higher degradation is less than the maximum vehicle speed threshold for an electric energy storage device exhibiting less degradation as shown in FIG. 3.

Alternatively, instead of adjusting the minimum electric energy storage device SOC for automatic engine stopping from a threshold for low electric energy storage device degradation to a minimum electric energy storage device SOC for automatic engine stopping from a threshold for higher electric energy storage device degradation, a single threshold for minimum electric energy storage device SOC for automatic engine stopping may be adjusted to a higher level (e.g., requiring electric energy storage device SOC to be a higher level to permit automatic engine stopping) or a lower level via adjusting coefficients of a polynomial that describes the minimum electric energy storage device SOC for automatic engine stopping threshold. Similarly, coefficients of polynomials describing maximum accessory load for permitting automatic engine stopping and maximum vehicle speed for permitting automatic engine stopping may be adjusted to lower or raise the maximum accessory load and maximum vehicle speed at which the engine may be automatically stopped. Method 400 proceeds to 412.

At 410, method 400 adjusts entry conditions for automatic engine stopping and starting to base levels. Method 400 requires that electric energy storage device SOC be greater than the minimum electric energy storage device SOC threshold for automatic engine stopping for an electric energy storage device exhibiting lower degradation (curve 312) when the actual percentage of electric energy storage device useful life consumed is less than the expected electric energy storage device useful life threshold. Method 400 requires that accessory load be less than a maximum accessory load threshold for automatic engine stopping for an electric energy storage device exhibiting lower degradation (curve 314) when the actual percentage of electric energy storage device useful life consumed is less than the expected electric energy storage device useful life threshold. Additionally, method 400 requires that electric energy storage device SOC be greater than the minimum electric energy storage device SOC threshold for automatic engine stopping for an electric energy storage device exhibiting lower degradation when actual percentage of DC/DC converter useful life consumed is less than the expected DC/DC converter useful life threshold. Method 400 also requires that accessory load be less than a maximum accessory load threshold for automatic engine stopping for an electric energy storage device exhibiting lower degradation when actual percentage of DC/DC converter useful life consumed is less than the expected DC/DC converter useful life threshold. Method 400 also requires that electric energy storage device SOC be greater than the minimum electric energy storage device SOC threshold for automatic engine stopping when an electric energy storage device is exhibiting lower degradation and when actual percentage of power relay useful life consumed is greater than the expected power relay useful life threshold. Method 400 requires that accessory load be less than a maximum accessory load threshold (curve 314) for automatic engine stopping for an electric energy storage device exhibiting lower degradation when actual percentage of DC/DC converter useful life consumed is less than the expected DC/DC converter useful life threshold.

Regarding engine starting requirements, method 400 requires that electric energy storage device SOC be greater than the minimum electric energy storage device SOC threshold for automatic engine starting for an electric energy storage device exhibiting lower degradation when the actual percentage of electric energy storage device useful life consumed is less than the expected electric energy storage device useful life threshold. Method 400 also requires that accessory load be less than a maximum accessory load threshold for automatic engine starting for an electric energy storage device exhibiting lower degradation when the actual percentage of electric energy storage device useful life consumed is less than the expected electric energy storage device useful life threshold. Method 400 also requires that electric energy storage device SOC be greater than the minimum electric energy storage device SOC threshold for automatic engine starting for an electric energy storage device exhibiting lower degradation when actual percentage of DC/DC converter useful life consumed is less than the expected DC/DC converter useful life threshold. Method 400 also requires that accessory load be less than a maximum accessory load threshold for automatic engine starting for an electric energy storage device exhibiting lower degradation when actual percentage of DC/DC converter useful life consumed is less than the expected DC/DC converter useful life threshold. Method 400 also requires that electric energy storage device SOC be greater than the minimum electric energy storage device SOC threshold for automatic engine starting for an electric energy storage device that is exhibiting lower degradation and when actual percentage of power relay useful life consumed is greater than the expected power relay useful life threshold. Method 400 also requires that accessory load be less than a maximum accessory load threshold for automatic engine starting for an electric energy storage device that is exhibiting lower degradation and when actual percentage of power relay useful life consumed is greater than the expected power relay useful life threshold. Method 400 proceeds to 412.

At 412, method 400 automatically stops and starts the engine according to the entry condition thresholds and entry conditions previously mentioned. The engine may automatically be stopped and started via a controller judging whether or not the entry conditions previously mentioned have been met. Method 400 proceeds to exit.

Thus, the method of FIG. 4 provides for a vehicle operating method, comprising: estimating an amount of electric energy storage device useful life consumed via a controller; adjusting automatic engine stop/start thresholds in response to the amount of electric energy storage device useful life consumed; and starting or stopping the engine in response to the automatic engine start/stop thresholds via the controller. The method includes where the automatic engine stop/start thresholds include a minimum electric energy storage device state of charge threshold for permitting automatic engine stopping responsive to a percentage of useful electric energy storage device life consumed. The method includes where the automatic engine stop/start thresholds include a maximum accessory load threshold for permitting automatic engine stopping responsive to a percentage of useful electric energy storage device life consumed.

In some examples, the method includes where the automatic engine stop/start thresholds include a maximum vehicle speed for permitting automatic engine stopping responsive to a percentage of useful electric energy storage device life consumed. The method includes where the automatic engine stop/start thresholds include a minimum electric energy storage device state of charge threshold for permitting automatic engine starting responsive to a percentage of useful electric energy storage device life consumed. The method includes where the automatic engine stop/start thresholds include a maximum accessory load threshold for permitting automatic engine starting responsive to a percentage of useful electric energy storage device life consumed. The method includes where the automatic engine stop/start thresholds include a maximum vehicle speed for permitting automatic engine stopping responsive to a percentage of useful electric energy storage device life consumed.

The method of FIG. 4 also provides for a vehicle operating method, comprising: estimating an amount of useful life consumed of a device via a controller, the amount of useful life consumed a summation of individual estimates; adjusting automatic engine stop/start thresholds in response to the amount of useful life consumed; and automatically starting or stopping the engine in response to the automatic engine start/stop thresholds via the controller. The method includes where the summation of individual estimates includes estimates of DC/DC converter life consumed. The method includes where the summation of individual estimates includes estimates of electric energy storage device life consumed. Note that maximum thresholds or limits described herein may be referred to as upper thresholds or limits. Likewise, minimum thresholds or limits described herein may be referred to as lower thresholds or limits.

In some examples, the method includes where the summation of individual estimates includes estimates of power relay life consumed. The method includes where the automatic engine stop/start thresholds include a minimum electric energy storage device state of charge threshold for permitting automatic engine stopping responsive to a percentage of useful electric energy storage device life consumed. The method includes where the automatic engine stop/start thresholds include a maximum accessory load threshold for permitting automatic engine stopping responsive to a percentage of useful electric energy storage device life consumed. The method includes where the automatic engine stop/start thresholds include a maximum vehicle speed for permitting automatic engine stopping responsive to a percentage of useful electric energy storage device life consumed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle operating method, comprising:
   estimating an amount of electric energy storage device useful life consumed via a controller;
   adjusting automatic engine stop/start thresholds in response to the amount of electric energy storage device useful life consumed; and
   starting or stopping the engine in response to the automatic engine start/stop thresholds via the controller.

2. The method of claim 1, where the automatic engine stop/start thresholds include a minimum electric energy storage device state of charge threshold for permitting automatic engine stopping responsive to a percentage of useful electric energy storage device life consumed.

3. The method of claim 1, where the automatic engine stop/start thresholds include a maximum accessory load threshold for permitting automatic engine stopping responsive to a percentage of useful electric energy storage device life consumed.

4. The method of claim 1, where the automatic engine stop/start thresholds include a maximum vehicle speed for permitting automatic engine stopping responsive to a percentage of useful electric energy storage device life consumed.

5. The method of claim 1, where the automatic engine stop/start thresholds include a minimum electric energy storage device state of charge threshold for automatic engine starting responsive to a percentage of useful electric energy storage device life consumed.

6. The method of claim 5, where the automatic engine stop/start thresholds include a maximum accessory load threshold for automatic engine starting responsive to a percentage of useful electric energy storage device life consumed.

7. The method of claim 1, where the automatic engine stop/start thresholds include a maximum vehicle speed for automatic engine stopping responsive to a percentage of useful electric energy storage device life consumed.

8. A vehicle operating method, comprising:
   estimating an amount of useful life consumed of a device via a controller, the amount of useful life consumed a summation of individual estimates;
   adjusting automatic engine stop/start thresholds in response to the amount of useful life consumed; and
   automatically starting or stopping the engine in response to the automatic engine start/stop thresholds via the controller.

9. The method of claim 8, where the summation of individual estimates includes estimates of DC/DC converter life consumed.

10. The method of claim 8, where the summation of individual estimates includes estimates of electrical energy storage device life consumed.

11. The method of claim 8, where the summation of individual estimates includes estimates of power relay life consumed or inverter system life consumed.

12. The method of claim 8, where the automatic engine stop/start thresholds include a minimum electric energy storage device state of charge threshold for permitting automatic engine stopping responsive to a percentage of useful electric energy storage device life consumed.

13. The method of claim 8, where the automatic engine stop/start thresholds include a maximum accessory load threshold for permitting automatic engine stopping responsive to a percentage of useful electric energy storage device life consumed.

14. The method of claim 8, where the automatic engine stop/start thresholds include a maximum vehicle speed for permitting automatic engine stopping responsive to a percentage of useful electric energy storage device life consumed.

15. A vehicle system, comprising:
   an engine including a device, the device participating in automatically starting and stopping the engine; and a controller including non-transitory instructions executable to adjust automatic engine stop/start thresholds in response to an amount of useful life consumed of the device, and to automatically start or stop the engine in response to the automatic engine start/stop thresholds.

16. The vehicle system of claim 15, where the device is a DC/DC converter.

17. The vehicle system of claim 15, where the device is an electric energy storage device.

18. The vehicle system of claim 15, where the device is a power relay.

19. The vehicle system of claim 15, where the automatic engine stop/start thresholds include a minimum electric energy storage device state of charge threshold.

20. The vehicle system of claim 15, where automatic engine stop/start thresholds include a maximum accessory load threshold.

\* \* \* \* \*